UNITED STATES PATENT OFFICE.

JOSEPH A. GRIFFIN, OF SYRACUSE, NEW YORK.

IMPROVEMENT IN COMPOUNDS AS A SUBSTITUTE FOR EGGS.

Specification forming part of Letters Patent No. 170,670, dated December 7, 1875; application filed November 9, 1875.

*To all whom it may concern:*

Be it known that I, JOSEPH A. GRIFFIN, of the city of Syracuse, county of Onondaga and State of New York, have invented a new and useful Compound to be used as a Substitute for Eggs, of which the following is a specification:

The invention relates to that class of compounds used to facilitate and improve the processes carried on in the preparation of food, and also to improve the quality of cakes, pies, puddings, bread, biscuit, and other articles of food in which this compound is used as an ingredient.

To prepare the compound, take ten parts cream tartar, three parts tartaric acid, one part alum, nine parts soda bicarbonate, one part sugar, two-thirds part curcuma, one part gum-arabic, one-third part sulphur, twenty-three parts starch, and mix them thoroughly by any usual mechanical means.

This compound has, by a long and thorough trial, proven to be a perfect substitute for eggs in all culinary and other uses to which eggs have been commonly applied, and is a cheaper article, and will produce better results by its use, than eggs themselves in all ordinary uses.

To illustrate the use of the substitute for eggs the following recipe is given:

Plain cake.—I take one teacup sugar, two-thirds cup milk, quarter cup butter, two cups flour, two teaspoonsful substitute for eggs. Bake in quick oven.

The substitute will keep without decomposition, and with proper care, longer than eggs, and contains in equal amounts more of the essential qualities for which eggs are valuable than eggs themselves—*i. e.*, two tea-spoonsful of the substitute equals nearly three eggs in valuable culinary qualities.

I do not limit myself to exactly the proportions stated herein, but reserve the privilege of a variance thereof, which may be made without materially altering the nature and usefulness of the compound.

What I claim, and wish to secure by Letters Patent, is—

The compound consisting of cream tartar, tartaric acid, alum, soda bicarbonate, sugar, curcuma, gum-arabic, sulphur, and starch, in about the proportions above specified, as and for the purpose described.

JOSEPH A. GRIFFIN.

Witnesses:
M. D. GRIFFIN,
C. R. DOW.